United States Patent
Bosquet et al.

(10) Patent No.: US 10,207,420 B2
(45) Date of Patent: Feb. 19, 2019

(54) FABRICATING A PLATE OF LARGE THICKNESS INCLUDING A DETACHABLE CARD OF SMALL THICKNESS

(71) Applicant: IDEMIA FRANCE, Colombes (FR)

(72) Inventors: Olivier Bosquet, Colombes (FR); Mickael Huet, Colombes (FR)

(73) Assignee: IDEMIA FRANCE, Colombes (FR)

( * ) Notice: Subject to any disclaimer, the term of this patent is extended or adjusted under 35 U.S.C. 154(b) by 75 days.

(21) Appl. No.: 14/901,713

(22) PCT Filed: Jun. 25, 2014

(86) PCT No.: PCT/FR2014/051606
§ 371 (c)(1),
(2) Date: Dec. 28, 2015

(87) PCT Pub. No.: WO2015/001226
PCT Pub. Date: Jan. 8, 2015

(65) Prior Publication Data
US 2016/0368160 A1     Dec. 22, 2016

(30) Foreign Application Priority Data
Jul. 1, 2013   (FR) ..................................... 13 56358

(51) Int. Cl.
*B26F 3/00* (2006.01)
*B26D 3/08* (2006.01)
*G06K 19/077* (2006.01)

(52) U.S. Cl.
CPC .............. *B26F 3/002* (2013.01); *B26D 3/085* (2013.01); *G06K 19/07732* (2013.01)

(58) Field of Classification Search
CPC ........ B26F 3/02; B26F 2210/00; B26D 3/085; G06K 19/07732
See application file for complete search history.

(56) References Cited

U.S. PATENT DOCUMENTS

| | | | |
|---|---|---|---|
| 5,520,979 A | * | 5/1996 | Hashimoto ........... B26F 1/3846 206/303 |
| 2015/0001306 A1 | * | 1/2015 | Ottobon ................... G06K 1/02 235/492 |

(Continued)

FOREIGN PATENT DOCUMENTS

| | | |
|---|---|---|
| DE | 19513282 A1 | 10/1996 |
| EP | 2568418 A1 | 3/2013 |

OTHER PUBLICATIONS

International Search Report dated Sep. 2, 2014, for International Application No. PCT/FR2014/051606 filed Jun. 25, 2014, pp. 1-5.

*Primary Examiner* — Omar Flores Sanchez
(74) *Attorney, Agent, or Firm* — MH2 Technology Law Group, LLP

(57) ABSTRACT

A method and tooling for fabricating a thin plastic plate of large format and of large thickness and including a card of small format and of small thickness that is detachable from the plate. The method, which may be implemented using the tooling, includes operations for making a spotface in a face of the plate to a depth equal to the difference between the large thickness and the small thickness; punching in the spotface zone along a leveling direction facing another face of the plate opposite from the first face, to a leveling stroke ($e_n$) equal to the depth of the spotface, in order to bring the bottom of the spotface level with the first face of the plate; and pre-cutting an outline of the card within the leveled zone, in order to make the card detachable.

17 Claims, 9 Drawing Sheets

(Section A-A)

(56) References Cited

U.S. PATENT DOCUMENTS

Figure 3:
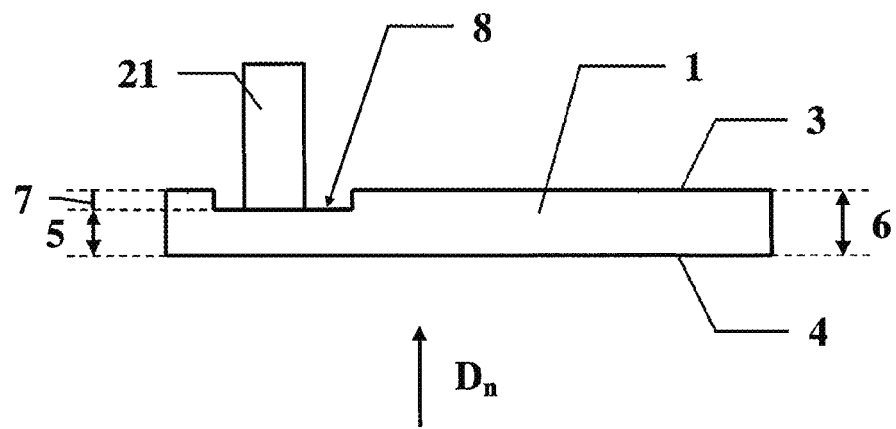

| | | | |
|---|---|---|---|
| 2015/0028547 A1* | 1/2015 | Haglund | B26F 1/44 277/312 |
| 2016/0136835 A1* | 5/2016 | Ohshima | H01F 41/0286 225/104 |
| 2016/0151928 A1* | 6/2016 | Bohn | B26D 3/085 83/24 |
| 2016/0368160 A1* | 12/2016 | Bosquet | B26D 3/085 |

* cited by examiner

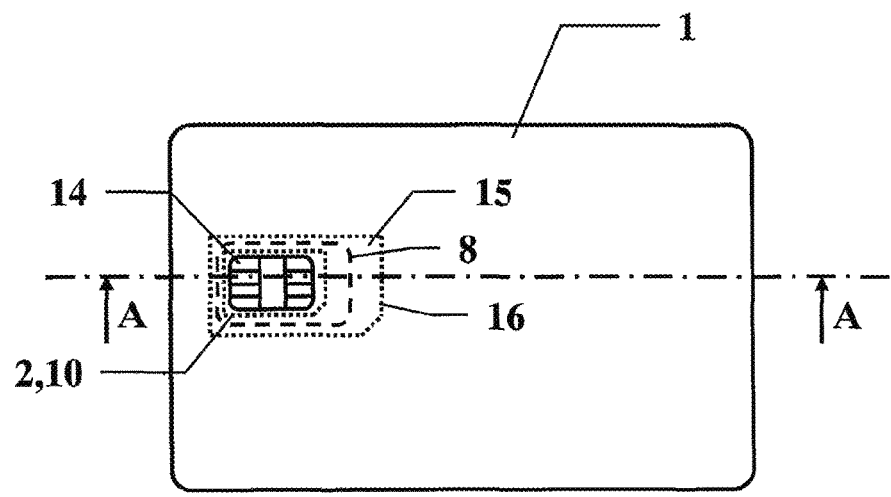
FIG. 1
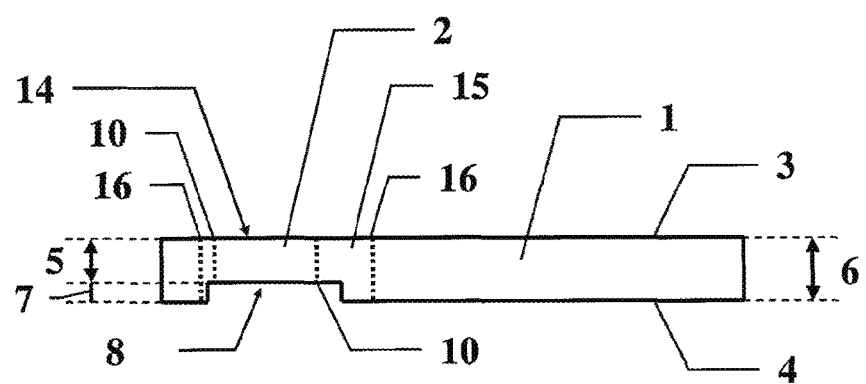
FIG. 2 (Section A-A)

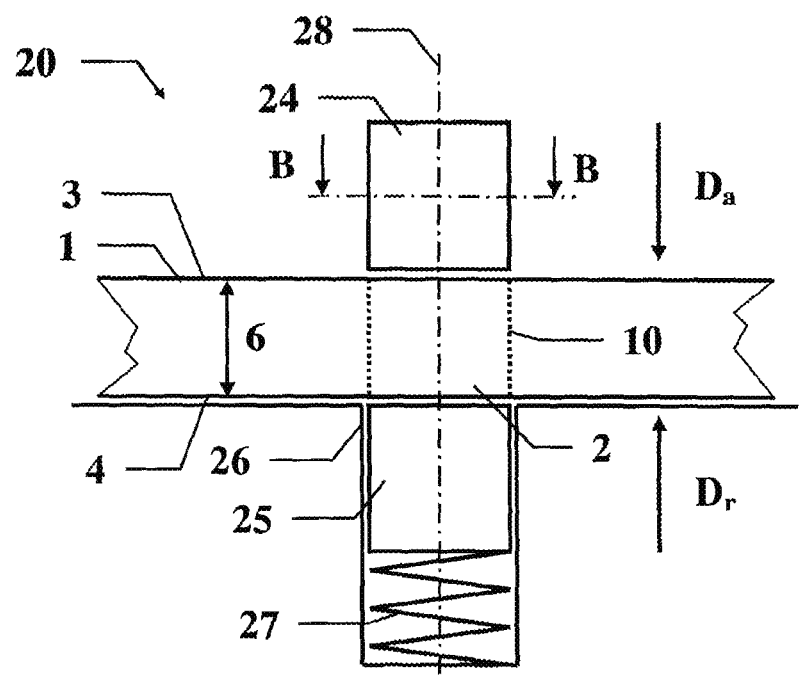
FIG. 9
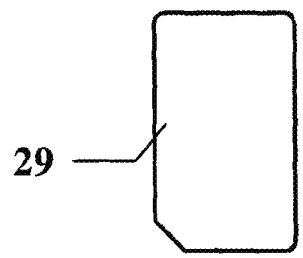
FIG. 10 (Section B-B)

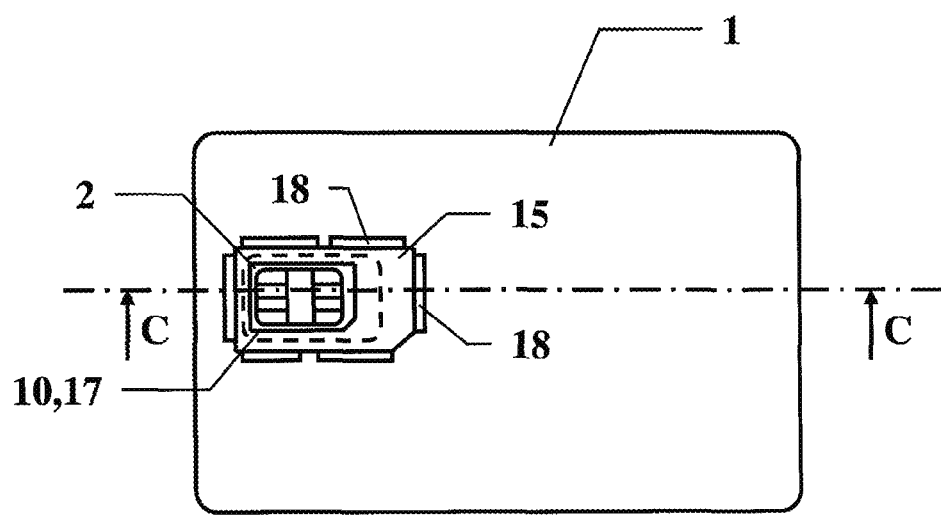
FIG. 16
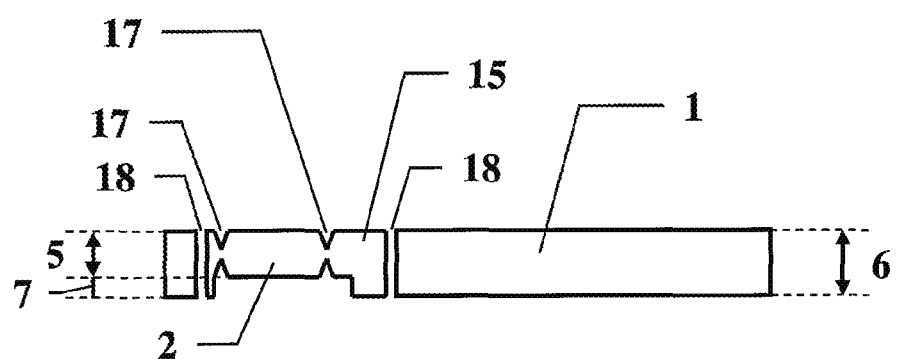
FIG. 17 (Section C-C)

FABRICATING A PLATE OF LARGE THICKNESS INCLUDING A DETACHABLE CARD OF SMALL THICKNESS

CROSS-REFERENCE TO RELATED APPLICATIONS

This application is a U.S. National Stage application of International Application No. PCT/FR2014/051606 filed 25 Jun. 2014, which claims priority to French Application No. 1356358 filed 1 Jul. 2103, the entire disclosures of which are hereby incorporated by reference in their entireties.

BACKGROUND OF THE INVENTION

The present invention relates to the field of cards such as microcircuit cards, and to fabricating said cards.

Microcircuit cards are used in a variety of fields, such as banking for making debit or credit cards, authenticating people in order to make identity documents, or cellular telephony for making subscriber telephone cards or subscriber identity module (SIM) cards.

In these fields, the thickness of cards has remained unchanged since the invention and standardization of microcircuit cards.

More particularly, in the field of telephony, microcircuit cards or SIM cards have seen their format become smaller as the size of terminals has become smaller.

Thus, cards initially presented a format known as 1FF that is substantially rectangular with dimensions of 54 millimeters (mm)×85.6 mm with a thickness of 0.76 mm±0.08 mm. That format was then replaced by a smaller 2FF format having dimensions of 15 mm×25 mm, with the same thickness. An even, smaller 3FF format has recently been created with dimensions of 12 mm×15 mm and thickness that is still unchanged.

A problem arises with a new 4FF format of dimensions reduced to 8.8 mm×12.3 mm, where the thickness is also reduced and should lie in the range 0.67 mm+0.03 mm/−0.07 mm.

It should be observed that the overlap zone that is common to both of these thickness ranges, namely [0.68, 0.70] presents a width of 20 micrometers (μm), which is too small for it to be possible to envisage making a plate that satisfies both formats in terms of thickness.

The usual practice is to deliver a detachable card in a plate of 1FF format and of large thickness, lying in the range 0.76 mm±0.08 mm. It is advantageous to be able to continue using existing plates and above all the numerous tools and fabrication means that already exist, even when fabricating new 4FF format cards.

Furthermore, the various above-mentioned formats are going to coexist, so it is appropriate to make at least one format adapter between the new 4FF format and the older 3FF, 2FF, and 1FF formats. Such an adapter presents an outer format similar to one of the old formats. Once again, the practice is to have one or more such adapters together with a card in a single plate of 1FF format. Such an adapter is necessarily of large thickness, at least over a portion of its surface area.

The small format card typically comprises a module integrating a microcircuit and a contact plate. The contact plate is an interface of the microcircuit, e.g. for interfacing with a reader, which contact face is sometimes wrongly referred to as a chip since it is the only visible portion of the module. Regardless of whether the small format card is used on its own, when detached from the plate and in a reader using a small thickness format, or while still secured to the plate and in a reader using a large thickness format, the contact plate must remain flush with a face of the card.

This means firstly that the thickness difference between the large thickness and the small thickness, e.g. provided in the form of a spotface, must necessarily be arranged entirely against one of the faces of the plate and that this face is necessarily the face opposite from the face where the contact plate is flush.

Such an arrangement requires action to be taken from one of the faces of the plate in order to make a spotface and action can be taken from the opposite face of the plate in order to put the module into place.

For various reasons that are described in greater detail below, it is difficult or even impossible to act on the face of the plate opposite from the face where the contact plate is flush.

The problem that the present invention seeks to solve is that of fabricating a thin plastics plate of large thickness including a card of small format and of small thickness that is detachable from the plate, while making use only of action taken from a single face of the plate.

To do this, the invention proposes tooling for fabricating a thin plastics plate of large format and of large thickness including a card of small format and small thickness that is detachable from the plate, comprising spotfacing means suitable for making a spotface in a first face of the plate, the spotface being of depth equal to the difference between the large thickness and the small thickness, a leveling punch suitable for performing leveling punching step in the spotface zone in a leveling direction facing a second face of the plate opposite from the first face, through a leveling stroke equal to the depth of the spotface, in order to bring the bottom of the spotface level with the first face of the plate, and pre-cutting means suitable for pre-cutting an outline of the card within the leveled zone, in order to make the card detachable.

According to another characteristic, the pre-cutting means comprise a go punch presenting a solid shape substantially identical to the outline of the card, and suitable for punching the plate along a go direction, a die presenting a hollow shape substantially identical to the outline of the card, and in alignment with the go punch in order to be capable of receiving the material pushed by the go punch, and a return punch presenting a solid shape substantially identical to the outline of the card, in alignment with the go punch and suitable for punching the plate in a return direction opposite to the go direction.

According to another characteristic, the leveling direction is identical to the go direction, the go punch and the leveling punch are the same punch, and a go stroke of the go punch is substantially equal to a return stroke of the return punch plus the leveling stroke.

According to an alternative characteristic, the leveling direction is identical to the return direction, the return, punch and the leveling punch are the same punch, and a return stroke of the return punch is substantially equal to a go stroke of the go punch plus the leveling stroke.

According to another characteristic, the return punch includes return means that are loaded when the return punch is subjected to thrust along the go direction, and urging the return punch along the return direction when the thrust ceases.

According to another characteristic, the return means at rest are such that the return punch projects from the die in the leveling direction by a height equal to the leveling stroke.

The invention also provides a method of fabricating a thin plastics plate of large format and of large thickness and including a card of small format and of small thickness that is detachable from the plate, the method comprising the steps of: making a spotface in a first face of the plate to a depth equal to the difference between the large thickness and the small thickness, leveling punching in the spotface zone along a leveling direction facing a second face of the plate opposite from the first face, through a leveling stroke equal to the depth of the spotface, in order to bring the bottom of the spotface level with the first face of the plate, and pre-cutting an outline of the card within the leveled zone, in order to make the card detachable.

According to another characteristic, the pre-cutting step comprises the following steps: go punching the plate by means of a go punch presenting a solid shape substantially identical to the outline of the card, the punching taking place along a go direction against a die presenting a hollow shape substantially identical to the outline of the card and in alignment with the go punch, in order to receive the material pushed by the go punch, and return punching the plate by means of a return punch presenting a solid shape substantially identical to the outline of the card and in alignment with the go punch, the return punching taking place along a return direction opposite to the go direction.

According to another characteristic, the leveling direction is identical to the go direction and the go punching step and the leveling punching step are a single punching step with a go stroke substantially equal to a return stroke of the return punching step plus the leveling stroke.

According to an alternative other characteristic, the leveling direction is identical to the return direction, and the return punching step and the leveling punching step comprise a single punching step through a return stroke substantially equal to a go stroke of the go punching step plus the leveling stroke.

According to another characteristic, the method further comprises a second pre-cutting step of pre-cutting a second outline circumscribing the leveled zone in order to form a detachable adapter.

According to another characteristic, the second pre-cutting step comprises the steps of: go punching the plate by means of a second go punch presenting a solid shape substantially identical to the second outline and performed along a second go direction against a second die presenting a hollow shape substantially identical to the second outline and in alignment with the second go punch in order to be capable of receiving the material pushed by the second go punch, and return punching the plate by means of a second return punch presenting a solid shape substantially identical to the second outline and in alignment with the second go punch, punching taking place along a second return direction opposite to the second go direction.

According to another characteristic, the second go direction is identical to the go direction.

According to another characteristic, the second go direction is identical to the return direction.

According to another characteristic, the card is of 4FF format and the adapter is of 3FF format.

The invention also provides a product obtained by such a method and/or tooling.

Figure 4:
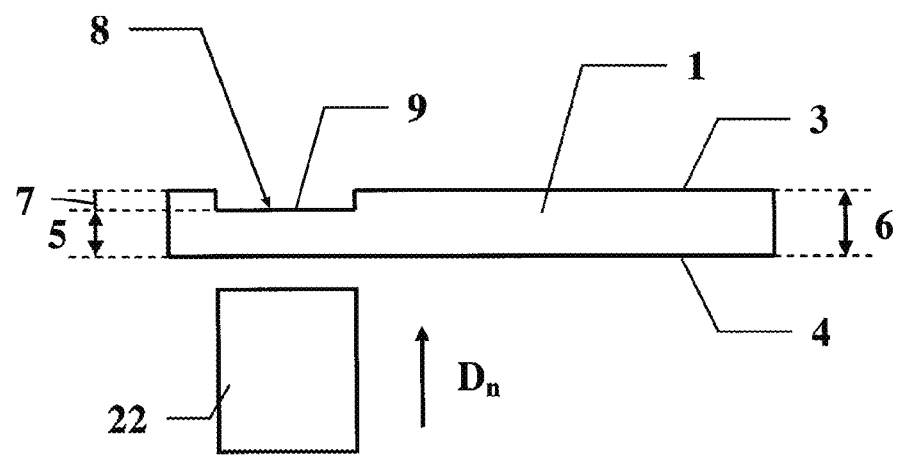
Figure 5:
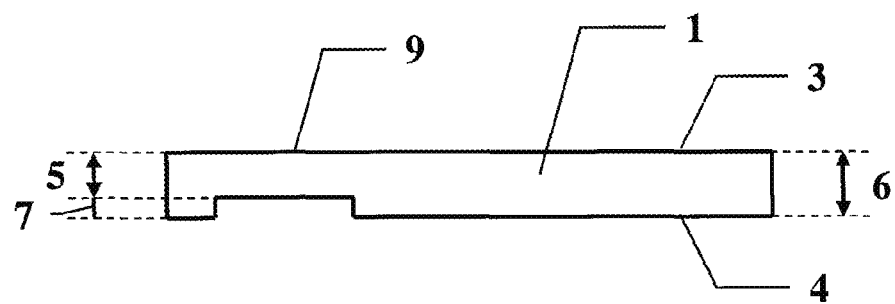
Figure 6:
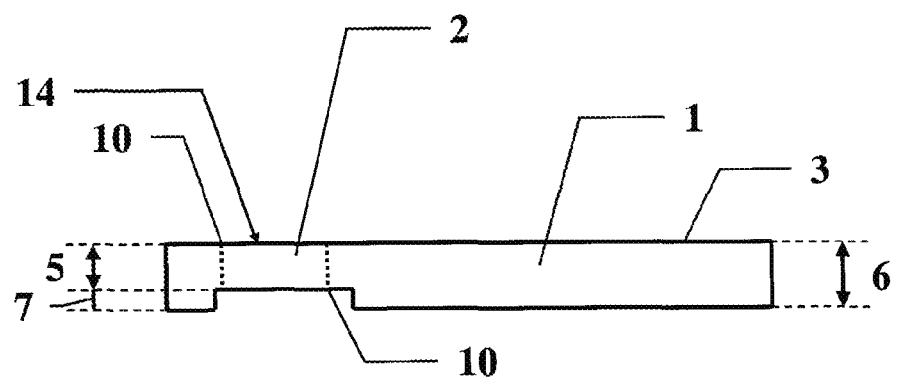
Figure 7:
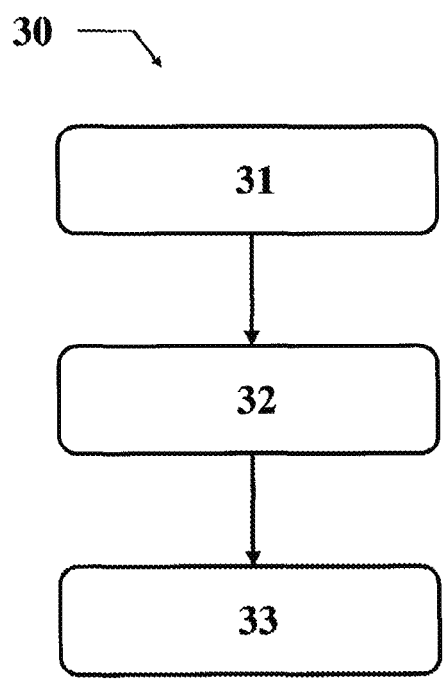
Figure 8:
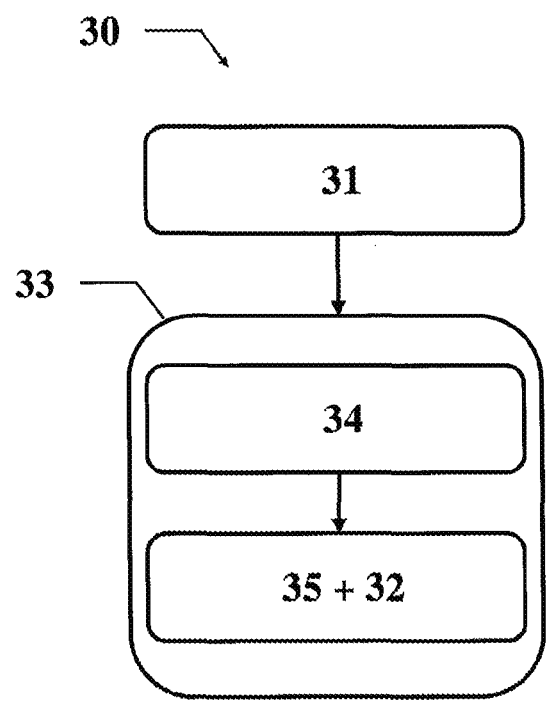
Figure 11:
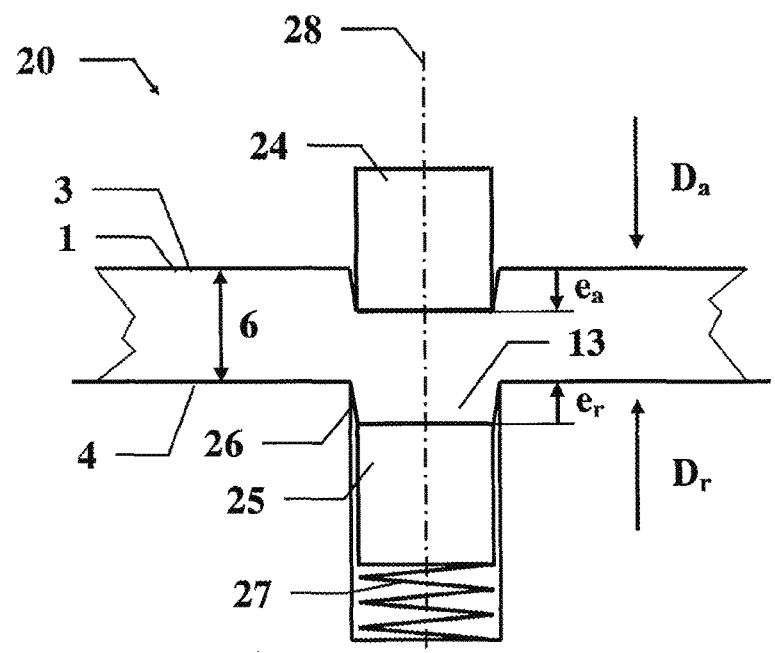
Figure 12:
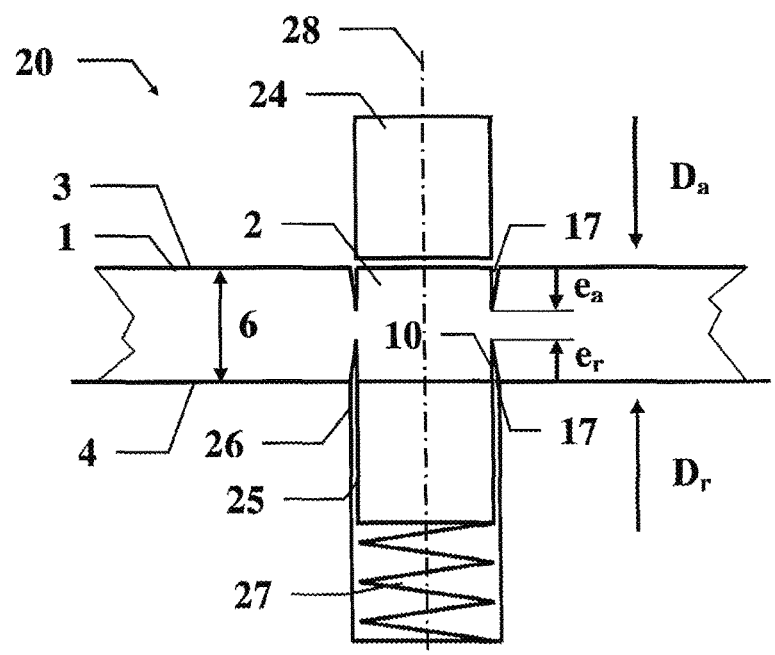
Figure 13:
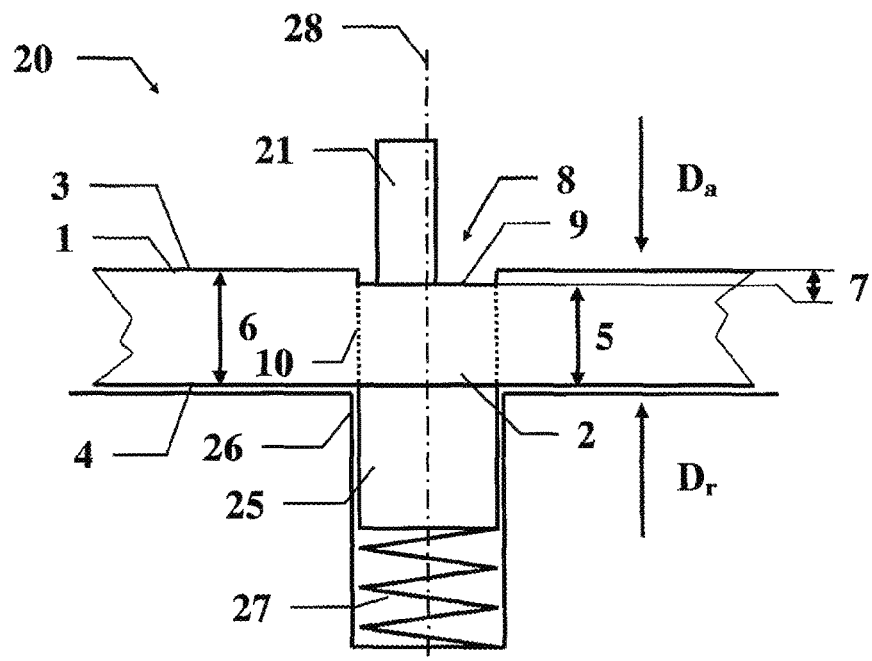
Figure 14:
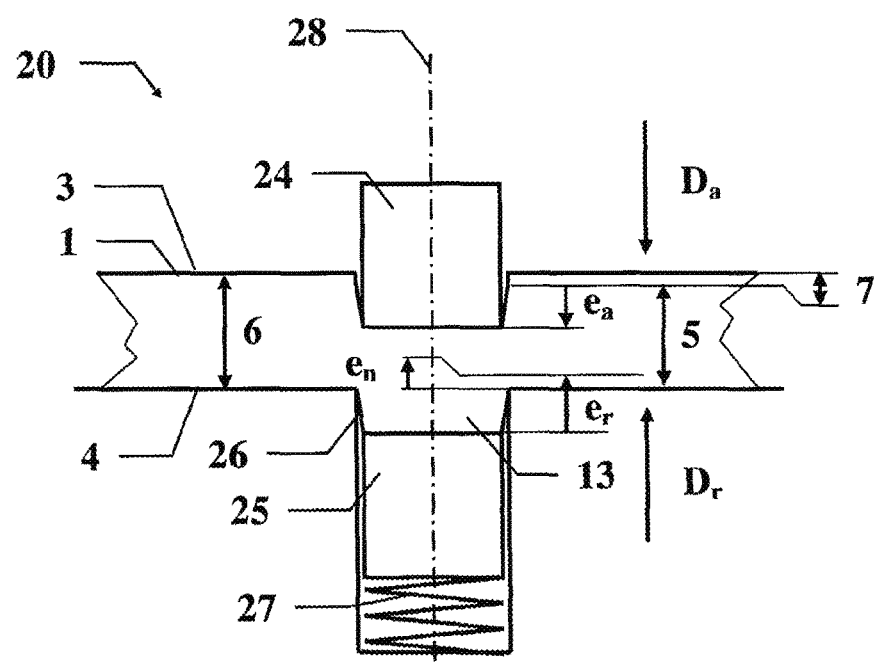
Figure 15:
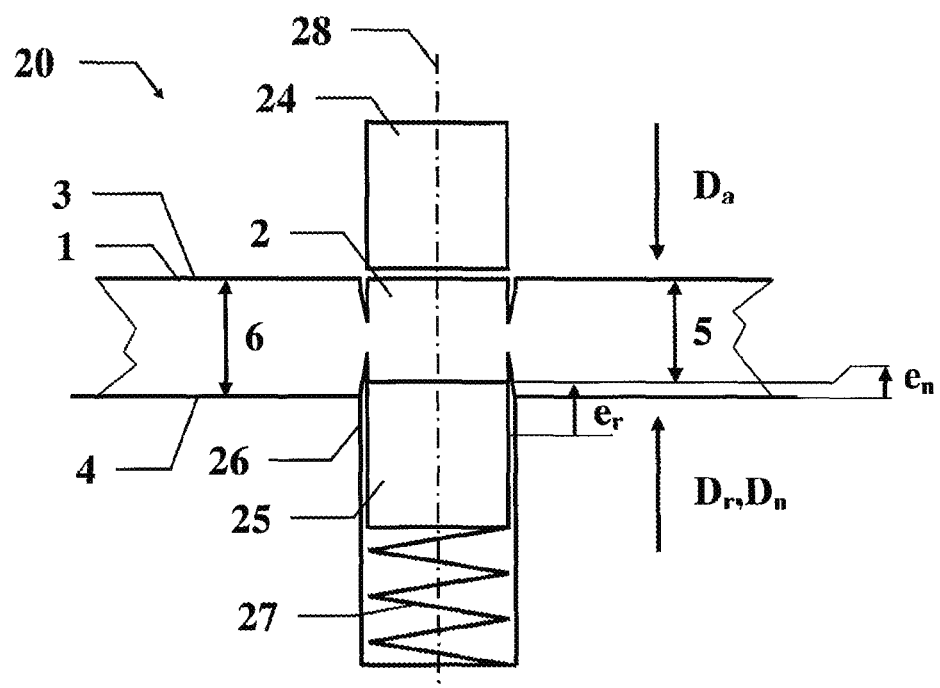

Other characteristics, details, and advantages of the invention appear more clearly from the detailed description given below by way of indication with reference to the drawings, in which:

FIGS. 1 and 2 show an expected product;
FIGS. 3 to 5 show the principle of a method of the invention in three steps;
FIG. 3: spot facing;
FIGS. 4 and 5; leveling;
FIG. 6; pre-cutting;
FIGS. 7 and 8 show two implementations of a method of the invention;
FIGS. 9 and 10 show an embodiment of tooling of the invention;
FIGS. 11 and 12 show the principle of a method of performing pre-cutting;
FIGS. 13 to 15 show a method combining pre-cutting and leveling; and
FIGS. 16 and 17 show two alternative embodiments of a pre-cut outline.

FIG. 1 is a face view and FIG. 2 is a section view showing an embodiment of an expected product. It is desired to make a thin plastics plate 1, e.g. a card in accordance with the ISO 7816 standard. This plate 1 is of large format, e.g. the ID-1 format of that standard. It presents considerable thickness 6, e.g. lying in the range 680 micrometers (μm) to 840 μm in accordance with that standard. The plate 1 includes a card 2 of small format, e.g. of 4FF format according to that standard, and of small thickness 5, e.g. lying in the range 600 μm to 700 μm, according to that standard.

It may be observed that the above example is significant in that the overlap between the range of large thickness 6 and the range of small thickness 5, extending from 680 μm to 700 μm and presenting a thickness of 20 μm is too narrow to enable the plate/card to be fabricated with a single thickness common to the plate 1 and the card 2.

The card 2 is secured to the plate 1 and, where appropriate, it may be used in this way, e.g. in a reader corresponding to the large format. The card 2 may also be detached from the plate 1. For this purpose, the outline 10 of the card 2 is weakened by a pre-cutting operation. Such weakening enables the cutting out of the outline 10 to be finished off, typically manually, in order to detach the card 2 from the plate 1. The card 2 can thus be used on its own, e.g. in a reader corresponding to the small format.

Since the thickness cannot be the same for the plate 1 and for the card 2, it is appropriate to reduce the thickness of the plate 1, at least in the zone where the card 2 is defined. For this purpose, one solution consists in making a spotface 8.

In certain applications, the card 2 is a microcircuit card. Such a card 2 comprises a module integrating a microcircuit and a contact plate 14. The contact plate 14 is an interface of the microcircuit, e.g. with a reader, and is sometimes wrongly referred to as a "chip", since it is the only visible portion of the module. Regardless of whether the card 2 is used on its own, after being detached from the plate 1 in a reader for a format of small thickness, or whether it remains secured to the plate 1 in a reader for a format of large thickness, the contact plate 14 must be flush with one of the faces of the card 2.

This means that the difference in thickness 7 between the large thickness 6 and the small thickness 5 must necessarily be located entirely beside one of the faces 3 and 4 of the plate 1. As shown in FIGS. 1 and 2, in the embodiment where the thickness difference 7 is obtained by a spotface 8 of depth equal to this thickness difference 7, said spotface 8 needs to be made in one face 4 of the plate 1, the bottom face in FIG. 2. This also means that the face 4 is necessarily the face 4 opposite from the face 3 where the contact plate 14 is flush, i.e. the top face in FIG. 2.

Such an arrangement makes it necessary to act from a face 4 of the plate 1 in order to make a spotface 8 and to act from the opposite face 3 in order to put the module and the contact plate 14 into place.

Unfortunately, it would appear to be difficult if not impossible to act on the face 4 of the plate 1 opposite from the face 3 where the contact plate 14 is flush.

It so happens that all machines for fabricating plates/cards are designed to work on one face only. Thus, the module is put into place from the first face 3. The second face 4, opposite from the first face 3, serves as a reference and a bearing point. The plate/card is pressed via the second face 4 against the workplate of the machine. That is why it is preferable to have a surface that is plane and smooth, in order to avoid any risk of catching during transfer operations.

In FIG. 1, it can be seen that for a 4FF format, as shown for the outline 10 of the card 2, the residual surface area of the card 2 that does not include the contact plate 14 is very small; corresponding to 17% of the surface area of the card 2. Thus, any marking or inscription, such as an identity number or a logo of the manufacturer cannot be placed on the first face 3 of the card 2. Consequently, the second face 4 of the card is dedicated to such marking. The marking is preferably made at the same time as the place 1 is made. It is not possible to make the spotface by machining if such a spotface is made in the second face 4 since that would destroy the marking.

It is thus appropriate to propose some other technique of obtaining the product shown in FIGS. 1 and 2 without performing an operation on the second face 4 opposite from the first face 3, and in particular without an operation of machining said second face 4.

This technique, as proposed in the present specification, is shown in FIGS. 3 to 6. The method of the invention comprises three main steps, sequenced as shown in FIG. 7.

In a first step 31, shown in FIG. 3, a spotface 8 is made in the first face 3 of the plate 1. This spotface 8 may be made by spotfacing means 21. This may involve machining, e.g. by means of a milling cutter. Alternatively, it is also possible to make the spotface 8 by stamping/punching the plate 1 with a punch 21 that is complementary to the spotface 8. Alternatively, it is also possible to make the spotface 8 by molding the plate 1, using a mold having a shape that is complementary to the spotface 8.

Under all circumstances, the spotface 8 is such that it presents a depth 7 equal to the difference between the large thickness 6 of the plate 1 and the small thickness 5 desired for the card 2.

With a microcircuit card, the module is arranged in the first face 3 where the spotface 8 is made. The module is placed in the spot face 8 in such a manner that its contact plate 14 is flush with the bottom 9 of the spotface 8. Advantageously, the spotface 8 may be made by machining associated jointly with machining a housing for receiving the module.

In this context, at least two embodiments may be considered. Either the module is put into place in the spotface 8 during or after making said spotface 8. Or else the module is put into place after the leveling step that is described below.

In a second step 32, shown in FIGS. 4 and 5, a leveling operation 32 is then performed, with FIG. 4 showing the state before the leveling operation and FIG. 5 showing the state after. This leveling 32 seeks to move the material of the plate 1 in register with the spotface 8 in a leveling direction $D_n$ facing the second face 4 of the plate 1, in other words the leveling direction $D_n$ goes from the second face 4 towards the first face 3 of the plate 1. This movement of material is such that the bottom 9 of the spotface 8 comes up to the level of the first face 3.

By way of example, this may be done with a leveling punch 22 that performs a leveling punching step 32 in register with the zone including the spotface 8, or spotface zone. In this example, the leveling punching step 22 punches the second face 4 and pushes it back towards the first face 3 through a leveling stroke $e_n$ equal to the depth 7 of the spotface 8. Thus, after the leveling step 32, the surface of the bottom 9 of the spotface 8 coincides with or is flush with the first face 3. The result of the leveling step 32 is shown in FIG. 5.

In a third step 33, producing a result as shown in FIG. 6, the plate 1 is then subjected to pre-cutting 33 in the previously leveled zone. This pre-cutting 33 may be performed using pre-cutter means and the pre-cut forms an outline 10 for the card 2 that is inscribed in the leveled zone. This pre-cutting step 33 shapes the card 2 and makes it detachable from the plate 1.

The pre-cutting step 33 is described above as being subsequent to the leveling step 32. Alternatively, the pre-cutting step 33 may be performed prior to the leveling step 32, or even, as explained in greater detail below, together therewith.

It should be understood from the above description that the outline 10 of the card 2 lies in the leveled zone, and that the leveled zone itself lies in the spotface zone.

Several techniques are possible for pre-cutting the outline 10 of the card 2 in the plate 1.

An advantageous technique, constituting the subject matter of a parallel patent application in the name of the Applicant, is a technique making use of tooling 20 shown in FIGS. 9 and 10 and a method involving two punching steps, a go step 34 and a return step 35 based on principles shown in FIGS. 11 and 12.

Said tooling 20 is described below with reference to FIG. 9 which shows an embodiment in face view, together with FIG. 10 which shows a view in section on B-B.

The tooling 20 comprises a substantially horizontal workplate suitable for receiving the plate 1 and having a die 26 cut out therein.

The tooling 20 has a go punch 24. As can be seen in FIG. 10, this go punch 24 presents a solid shape 29 that is substantially identical to the shape of the pre-cut that is to be made, and thus substantially identical to the outline 10 of the card 2. The outline 10 is shown in dotted lines since it does not exist in the plate 1 before the pre-cutting step 33.

The go punch 24 is suitable for punching the plate 1 in a go direction $D_a$, e.g. a vertically downward direction in this example, as shown in the figure. The go punching step 34 thus presses the plate 1 against the die 26 that presents a recess of shape 29 that is substantially identical to the shape of the go punch 24 and thus substantially to the outline 10 of the card 2. The die 26 is in alignment with the go punch 24 along the punching axis 28 and is thus suitable for receiving the material 13 that is pushed by the go punch 24 during the go punching step 34.

The tooling 20 also has a return punch 25 presenting a solid shape 29 substantially identical to the outline 10 of the card 2. The return punch 25 is in alignment with the go punch 24 on the punching axis 28. The return punch 25 is suitable for punching the plate 1 in a return direction $D_r$, opposite to the go direction $D_a$. Thus, if the go punch 24 punches the plate 1 on its first face 3, then the return punch 25 punches the plate 1 on its second face 4 that is opposite the first face 3.

With reference to FIGS. 11 and 12, there follows a description of how this tooling 20 is used for making a pre-cut along the outline 10 of the card 2.

After the plate 1 has been put into place in the tooling 20, the go punching step 34 is performed by moving the go punch 24 along the go direction $D_a$. This produces the result shown in FIG. 11, where the plate 1 has been punched via its face 3 against which the go punch 24 comes into contact. As a result, the go punch 24 pushes the material 13 so that it penetrates into the die 26. The go punching step 34 is performed with a go stroke $e_a$.

In a second step, the return punching step 35 is performed by moving the return punch 35 along the return direction $D_r$, opposite to the go direction $D_a$. This produces the result shown in FIG. 12, where the plate 1 is punched via the other face 4, opposite from the first face 3 and engaging the return punch 25. As a result, the return punch 25 pushes back the material 13 that was previously pushed into the die 26 so as to replace it substantially in the thickness 6 of the plate 1. The return punching step 35 is performed with a return stroke $e_r$.

The go punching step 34 and the return punching step 35 in succession put the material substantially back into place. Nevertheless, these steps have created notches 17 in the faces 3 and 4 of the plate 1 that are of depth substantially equal to the go stroke $e_a$ and to the return stroke $e_r$, respectively. The go and return punches 24 and 25, and also the die 26 are advantageously of a shape 29 identical to the shape desired for the outline 10 of the card 2, these notches 17 being arranged along said outline 10. These notches constitute weakening that thus provides pre-cutting of the card 2 along the profile 10.

It may be observed that the respective go and return strokes $e_a$ and $e_r$ are of similar orders of magnitude. Nevertheless, it is acceptable for them to be different without going against the principle of weakening by forming notches 17.

Thus, according to an advantageous characteristic of the invention, the leveling step 32 may advantageously be combined with the pre-cutting step 33 by performing the leveling punching step 32, either during the go punching step 34, or else during the return punching step 35. The sequencing of the method 30 as modified in this way is shown in FIG. 8. The pre-cutting step 33 comprises a go punching step 34 and a return punching step 35. One or the other of these two punching steps 34 and 35 also performs the leveling step 32.

Thus, in a first implementation, the leveling step 32 is performed during the go punching step 34 of the pre-cutting step 33. In this implementation, the leveling direction $D_n$ is identical to the go direction $D_a$. The go punch 24 and the leveling punch 22 constitute a single punch, performing a go punching step 34 that is also the leveling punching step 32. In this implementation, not shown in the figures, the go punching step 34 is performed from the face 4 that is opposite from the spotface 8. In this implementation, the go stroke $e_a$ of the go/leveling punch 24/22 is substantially equal to a return stroke $e_r$ of the return punch 25 plus the leveling stroke $e_n$. Since the leveling stroke $e_n$ is equal to the difference 7 between the large thickness 6 and the small thickness 5, the go punching step 34 of the pre-cutting step 33 is "extended". Thus, after the return punching step, the bottom 9 of the spotface 8 is leveled with the first face 3.

In an alternative, second implementation, the leveling 32 is performed during the return punching step 35 of the pre-cutting step 33. In this implementation, the leveling direction $D_n$ is identical to the return direction $D_r$. The return punch 25 and the leveling punch 22 constitute a single punch, performing a return punching step 35 that coincides with the leveling punching step 32. In this implementation, as shown in FIGS. 13 to 15, the return punching step 35 is performed from the face 4 that is opposite from the spotface 8. In this implementation, the return stroke $e_r$ of the return and leveling punch 25 and 22 is substantially equal to a go stroke $e_a$ of the go punch 24 plus the leveling stroke $e_n$. Since the leveling stroke $e_n$ equal to the difference 7 between the large thickness 6 and the small thickness 5, the return punching step 35 of the pre-cutting step 33 is "extended" in order to level the bottom 9 of the spotface 8 with the first face 3.

The two implementations differ in the orientation of the plate 1 relative to the punches 24 and 25. The common principle consists in taking advantage of the two punching steps in opposite directions, the go step and the return step, in order to "extend" that one of the two punching steps, either the go step or the return step, that acts in the opposite direction to the spotface 8 in order to perform the leveling punching step 32.

As shown in FIGS. 13 to 15, the complete method in the second implementation where leveling 32 is performed during the return punching step 35 is as follows.

The method begins in FIG. 13. The plate 1 has been put into place in the tooling 20. The first step 31 consists in making the spotface 8 using spotfacing means 21, such as a milling cutter. Said spotface 8 is such that its depth 7 is equal to the difference between the large thickness 6 of the plate 1 and the small thickness 5 desired for the card 2.

Thereafter, the go punching step 34 is performed, as shown in FIG. 14. The go punch 24 is moved along the go direction $D_a$ and punches the plate 1 via its first face 3 against the die 26 arranged facing and against the opposite face 4 of the plate 1. This moves the material of the plate 1 and a fraction 13 thereof is pushed into the die 26. The go punching step 34 is performed with a go stroke $e_a$ that is measured relative to the bottom 9 of the spotface 8.

Thereafter, the return punching step 35 is performed, as shown in FIG. 15. The return punch 25 is moved along the return direction $D_r$ and punches the plate 1 via its second face 4. This substantially replaces the material of the plate 1 in the thickness 6 of the plate 1. The two punching steps, the go step 34 and then the return step 35, also make it possible in passing to provide the weakening along the outline 10, thereby pre-cutting the card 2. The return punching step 35 is made to a return stroke $e_r$. The return punching step 35 is advantageously used simultaneously to perform the leveling step 32. For this purpose, the return stroke $e_r$ is taken to be equal, in absolute value, to the go stroke $e_a$ plus the leveling stroke $e_n$ needed for placing the bottom 9 of the spotface 8 in the plane of the first face 3.

In an advantageous embodiment of the tooling 20, as shown in FIGS. 9, and 11 to 15, the return punch 25 includes return means 27. The return means 27 are arranged so as to be loaded when the return punch 25 is subjected to thrust in the go direction $D_a$, and to return the return punch 25 along the return direction $D_r$ when go thrust ceases. Thus, as shown in FIG. 11 or 14, during the go punching step 34, the go punch 24 moves the pushed material 13 into the die 26. Said pushed material 13 then exerts thrust on the return punch 25 along the go direction $D_a$. Under the effect of this thrust, the return punch 25 is moved against the return means 27, thereby loading them. When the thrust is interrupted, e.g. when the go punch 24 is withdrawn, the return means 27 are released and urge the return punch 25 along the return direction $D_r$. This urging serves to perform the return punching step 35. Thus, and advantageously, only the go punch 24 needs to be actively controlled. The return punch 25 reacts to the go punching step 34, while the return punching step 35 together with the simultaneous leveling punching step 32, takes place passively, in response to the go punching step 34. This is advantageous since no operation is actively performed from the second face 4 of the plate 1.

In the configuration shown, which corresponds to the second implementation, and as described above, the return punching step 35 also performs the leveling punching step 32. As a result, the return stroke $e_r$ is greater than the go stroke $e_a$. As a result the go stroke $e_r$ on its own is not sufficient to load the return means 37 in order to produce the return stroke $e_r$ equal to the go stroke $e_a$ plus the leveling stroke $e_n$.

In order to remedy this problem, and according to an advantageous characteristic, the return means 27 are pre-stressed. For this purpose, the return means 27 at rest are such that the return punch 25 projects beyond the die 26 and thus beyond the plane on which the card 1 is laid, the punch projecting along the leveling direction $D_n$ by a height that is equal to the leveling stroke $e_n$.

The initial configuration of the return punch 25 is thus identical to that at the end of the method, as shown in FIG. 15. The return punch 25, pressed against the return means 27 at rest, projects in the leveling direction $D_n$, which in this example coincides with the return direction $D_r$, by a height equal to the leveling stroke $e_n$, or indeed equal to the difference 7 between the large thickness 6 and the small thickness 5. As a result, when putting a plate 1 into position on the worktable, and then performing the go punching step 34, the return punch 25 and the return means 27 are initially loaded to a depth equal to the height by which the return punch 25 projects, and equal to the leveling stroke $e_n$, when the plate 1 comes into contact with the worktable. Thereafter, when the go punch 24 actually punches into the material of the plate 1, said material moves down through the go stroke $e_a$ and entrains the return punch 25 and the return means 27 therewith through the same depth. In total, the return punch 25 and the return means 27 are loaded by a movement equal to the leveling stroke $e_n$ plus the go stroke $e_a$. The release of the return means 27 then allows the return punch 25 to perform the return punching step 35 through the return stroke $e_r$, which is equal to the sum of the leveling stroke $e_n$ plus the go stroke $e_a$.

Other pre-cutting techniques are also possible. Two of them are shown with reference to FIG. 16, which shows a plate 1 in face view, and with reference to FIG. 17, which shows the same plate 1 in section view. The plate 1 of large thickness 6 includes a format adapter 15 arranged around a card 2 of small format and of small thickness 5.

The adapter 15 is detachable from the plate 1 by means of pre-cutting performed using a first technique. In that technique, the pre-cutting is performed by cutting the outline of the adapter 15 by using slots 18. These slots 18 cut through the entire thickness of the plate 1 but cut through the profile over only a fraction of its length. The adapter 15 can be detached from the plate 1 by breaking the bridges that remain between the slots 18.

The card 2 is detachable from the adapter 15 by means of pre-cutting performed using a second technique. In this technique, the pre-cutting is performed by cutting the outline 10 of the card 2 by means of a notch 17 starting from one of the faces or by means of two facing notches 17, each starting from a respective one of the faces of the plate 1. These notches 17 cut through the plate 1 over a fraction only of its thickness. Advantageously, they may cut into the profile 10 along its entire length. The card 2 may be detached from the adapter 15 by breaking the residual, non-notched thickness in register with the notch(es) 17.

In the invention, these two pre-cutting techniques may be applied in alternation or together, in order to perform the pre-cutting step 33 of a method having a spotfacing step 31 and a leveling step 32.

In an implementation, the method may also include an additional step involving second pre-cutting to make a second precut along a second outline. This second outline is advantageously made in the large thickness and thus circumscribes the leveled zone. By way of example, this makes it possible to form an adapter that is detachable. A small format card 2 is thus present in the plate 1, which also includes an adapter to a larger format. Breaking the outline 10 serves to release the card 2 which can then be used on its own. Breaking the second outline serves to release the adapter and thus enables the card 2 to be used with a larger format corresponding to the second outline.

The second outline may be precut using any pre-cutter means.

In such an embodiment having multiple nested outlines, the order in which these outlines are made is advantageously from the center outwards, starting with the smallest and going towards the largest.

In a preferred implementation, the second outline is precut by using the same method as for the step of pre-cutting the outline 10.

Thus, the second pre-cutting step may be performed by the following sequence of steps. A first step involves go punching the plate using a second go punch having a solid shape that is substantially identical to the second outline and acting in a second go direction against a die presenting a hollow shape substantially identical to the second outline and in alignment with the second go punch so as to be able to receive the material pushed by the second go punch. Thereafter, a second step is performed of return punching the plate by means of a second return punch presenting a solid shape substantially identical to that of the second outline in alignment with the second go punch on a second return direction that is opposite to the second go direction. In the present situation, there is no longer any difference of thickness and the spot facing and leveling steps do not need to be performed. Thus, the go stroke of the second go punching step is substantially equal to the return stroke of the second return punching step.

It is possible to perform the go and return second punching steps in the same directions as the go and return first punching steps 34 and 35. This is advantageous in that there is no need to turn over the tooling or the card 1 between the punching step for making the outline 10 and the second punching step for making the second outline. Under such circumstances, the second go direction is identical to the go direction $D_a$, and the second return direction is identical to the return direction $D_r$.

Alternatively, it is possible to alternate. Under such circumstances, the second go direction is identical to the return direction $D_r$ and the second return direction is identical to the go direction $D_a$.

The method as described above enables two nested outlines to be obtained, the first outline 10 defining a card 2 of small format and small thickness, and the second outline defining an adapter of larger format and of larger thickness, at least at its periphery.

A particularly advantageous application is an embodiment in which the card 2 is of 4FF format and presents a small thickness corresponding to that format, and where the adapter is of 3FF format and presents a large thickness over at least a portion of its surface area and at very least at its periphery.

It is also possible to nest other outlines that are larger still around the second outline. It is thus possible to make an all-in-one unit comprising a 4FF format card of small thickness, surrounded by a 3FF adapter, in turn surrounded by a 2FF adapter, all of which are arranged in a plate of 1FF format.

The invention claimed is:

1. A tooling for fabricating a plate of large format and of large thickness including a card of small format and small thickness that is detachable from the plate, wherein the tooling comprises:
    spotfacing means suitable for making a spotface in a first face of the plate, the spotface being of a depth equal to the difference between the large thickness and the small thickness;
    a leveling punch suitable for performing leveling punching in a spotface zone in a leveling direction facing a second face of the plate opposite from the first face, through a leveling stroke equal to the depth of the spotface, in order to bring the bottom of the spotface level with the first face of the plate, the leveled bottom forming a leveled zone; and
    pre-cutting means suitable for pre-cutting an outline of the card within the leveled zone, in order to make the card detachable.

2. The tooling according to claim 1, wherein the pre-cutting means comprise:
    a go punch presenting a solid shape substantially identical to the outline of the card, and suitable for punching the plate along a go direction;
    a die presenting a hollow shape substantially identical to the outline of the card, and in alignment with the go punch in order to be capable of receiving material pushed by the go punch; and
    a return punch presenting a solid shape substantially identical to the outline of the card, in alignment with the go punch and suitable for punching the plate in a return direction opposite to the go direction.

3. The tooling according to claim 2, wherein the leveling direction is identical to the go direction, wherein the go punch and the leveling punch are the same punch, and wherein a go stroke of the go punch is substantially equal to a return stroke of the return punch plus the leveling stroke.

4. The tooling according to claim 2, wherein the leveling direction is identical to the return direction, wherein the return punch and the leveling punch are the same punch, and wherein a return stroke of the return punch is substantially equal to a go stroke of the go punch plus the leveling stroke.

5. The tooling according to claim 1, wherein the return punch includes return means that are loaded when the return punch is subjected to thrust along the go direction, and that urge the return punch along the return direction when the thrust ceases.

6. The tooling according to claim 5, wherein the return means at rest are such that the return punch projects from a die in the leveling direction by a height equal to the leveling stroke.

7. A method of fabricating a plate of large format and of large thickness and including a card of small format and of small thickness that is detachable from the plate, wherein the method comprises:
    making a spotface in a first face of the plate to a depth equal to the difference between the large thickness and the small thickness;
    leveling punching in a spotface zone along a leveling direction facing a second face of the plate opposite from the first face, through a leveling stroke equal to the depth of the spotface, in order to bring the bottom of the spotface level with the first face of the plate, the leveled bottom forming a leveled zone; and
    pre-cutting an outline of the card within the leveled zone, in order to make the card detachable.

8. The method according to claim 7, wherein the pre-cutting step comprises the following steps:
    go punching the plate by means of a go punch presenting a solid shape substantially identical to the outline of the card, the punching taking place along a go direction against a die presenting a hollow shape substantially identical to the outline of the card and in alignment with the go punch, in order to receive material pushed by the go punch; and
    return punching the plate by means of a return punch presenting a solid shape substantially identical to the outline of the card and in alignment with the go punch, the return punching taking place along a return direction opposite to the go direction.

9. The method according to claim 8, wherein the leveling direction is identical to the go direction and wherein the go punching step and the leveling punching step are a single punching step with a go stroke substantially equal to a return stroke of the return punching step plus the leveling stroke.

10. The method according to claim 8, wherein the leveling direction is identical to the return direction, and wherein the return punching step and the leveling punching step comprise a single punching step through a return stroke substantially equal to a go stroke of the go punching step plus the leveling stroke.

11. The method according to claim 7, further comprising:
    a second pre-cutting step of pre-cutting a second outline circumscribing the leveled zone in order to form a detachable adapter.

12. The method according to claim 11, wherein the second pre-cutting step comprises the following steps:
    go punching the plate by means of a second go punch presenting a solid shape substantially identical to the second outline and performed along a second go direction against a second die presenting a hollow shape substantially identical to the second outline and in alignment with the second go punch in order to be capable of receiving the material pushed by the second go punch; and
    return punching the plate by means of a second return punch presenting a solid shape substantially identical to the second outline and in alignment with the second go punch, punching taking place along a second return direction opposite to the second go direction.

13. The method according to claim 12, wherein the second go direction is identical to the go direction.

14. The method according to claim 12, wherein the second go direction is identical to the return direction.

15. A method according to claim 11, wherein the card is of 4FF format and wherein the detachable adapter is of 3FF format.

16. A product obtained by the method according to claim 7.

17. A product obtained by the tooling according to claim 1.

* * * * *